United States Patent

[11] 3,624,485

| [72] | Inventor | John F. Ringelman |
| | | Glen Burnie, Md. |
| [21] | Appl. No. | 43,444 |
| [22] | Filed | June 4, 1970 |
| [45] | Patented | Nov. 30, 1971 |
| [73] | Assignee | Westinghouse Electric Corporation |
| | | Pittsburgh, Pa. |

[54] SURGE CURRENT LIMITING CIRCUITRY FOR DIRECT CURRENT TO DIRECT CURRENT CHOPPER INVERTERS
5 Claims, 2 Drawing Figs.

[52] U.S. Cl. .................................................. 321/2, 321/11, 321/45 R, 331/113 A
[51] Int. Cl. ...................................................... H02m 3/32, H03k 3/281
[50] Field of Search ......................................... 331/113 A; 321/2, 11, 12, 18, 45 R

[56] References Cited
UNITED STATES PATENTS

| 3,382,456 | 5/1968 | Jackson et al. ................ | 331/113 A |
| 2,883,539 | 4/1959 | Bruck et al. .................. | 321/2 X |

FOREIGN PATENTS

| 996,601 | 6/1965 | Great Britain ................. | 331/113 A |

*Primary Examiner*—William H. Beha, Jr.
*Attorneys*—F. H. Henson, E. P. Klipfel and A. S. Oddi ABSTRACT: Surge current limiting circuitry for direct current to direct current inverters and the like of the type in which switching of transistors to reverse flux in a center-tapped output transformer is achieved by the use of a saturable core transformer. Surge currents in the saturable core transformer, as it saturates, are limited by means of switching transistors which switch the transformer drive currents to high impedance paths when the transformer saturates.

3,624,485

SURGE CURRENT LIMITING CIRCUITRY FOR DIRECT CURRENT TO DIRECT CURRENT CHOPPER INVERTERS

BACKGROUND OF THE INVENTION

As is known, the usual direct current to direct current chopper regulator consists of a pair of transistor switches or the like for alternately connecting one terminal of a direct current source to opposite ends of a transformer primary winding, the center tap on the primary winding being connected to the other terminal of the direct current source. In this manner, pulses of alternate polarity will appear across the transformer secondary as the transistors switch back and forth; and these can be rectified to produce a direct current voltage of higher or lower polarity than that applied to the primary, depending upon the turns ratio of the transformer.

The present invention is concerned with inverters of the type described wherein switching of the transistors is achieved by means of a saturable core transformer. In prior art inverters of this type, the opposite ends of the primary winding of the saturable core transformer are connected to the primary winding of the output transformer through a surge current limiting resistor; while the secondary winding of this same saturable core transformer is connected, at its opposite ends, to the bases of the switching transistors and at its midpoint to the junction of two other electrodes of the transistors. In operation, one switching transistor will initially conduct, causing current to flow in the primary winding of the saturable core transformer until it saturates, whereupon the flux in the transformer core collapes, causing the transistor which was conducting to cut off and the other transistor to conduct.

The difficulty with this system is that the aforesaid current limiting resistor must have a relatively low impedance with respect to the primary winding on the saturable core transformer. As a result, high current spikes will occur when the transformer saturates, causing a substantial dissipation of power to occur in the current limiting resistor.

SUMMARY OF THE INVENTION

In accordance with one embodiment of the invention shown herein, surge currents are minimized, in an inverter of the type described above, by a pair of transistors having their base-emitter junctions connected in shunt with portions of the primary winding of a saturable core transformer. In shunt with each transistor is a resistor, or other impedance, of relatively large magnitude. When the saturable core transformer saturates and the voltage across an emitter resistor for one of the aforesaid two transistors rises, the transistor is cut off; and current must flow through the aforesaid relatively large impedance and a diode in shunt with the other transistor, thereby preventing substantial surge currents. The action is the same when the current through the saturable core transformer is reversed, except that the other transistor and its shunt impedance now come into play.

The above and other objects and features of the invention will become apparent from the following detailed description taken in connection with the accompanying drawings which form a part of this specification, and in which.

Figure 1:
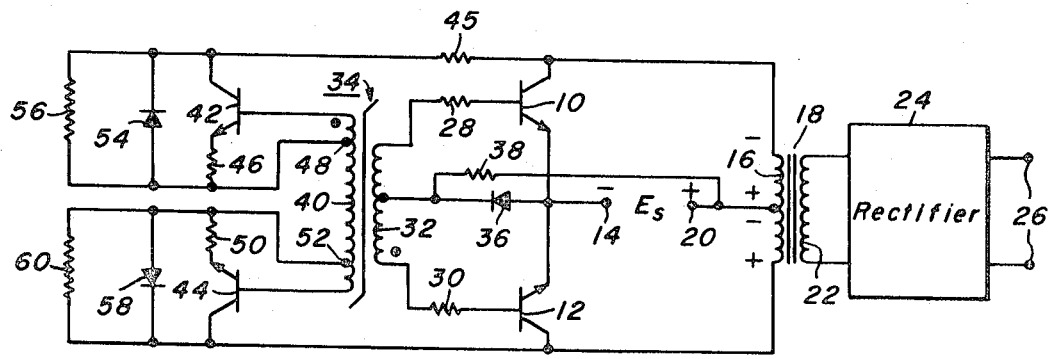
FIG. 1 is schematic circuit diagram of one embodiment of the invention.

With reference now to the drawings, and particularly to FIG. 1, the circuit shown includes a first pair of switching transistors 10 and 12 having their emitters connected to the negative terminal 14 of a source of direct current potential, not shown, indicated generally as $E_s$. The collector of transistor 10 is connected through the upper half of a center-tapped primary winding 16 of transformer 18 to the positive terminal of the voltage source $E_s$. Similarly, the collector of transistor 12 is connected through the lower half of the primary winding 16 to the positive terminal 20. In this manner, when transistor 10 conducts, a voltage of one polarity will appear across the secondary winding 22 of transformer 18; whereas when transistor 12 conducts, a voltage of the opposite polarity will appear across the secondary winding 22. These pulses are then rectified in rectifier 24, preferably a full-wave bridge rectifier, to produce a direct current voltage across output terminals 26 which is higher or lower than the voltage $E_s$, depending upon the turns ratio of the transformer 18.

The bases of the transistors 10 and 12 are connected through resistors 28 and 30, respectively, to the opposite ends of a center-tapped secondary winding 32 on saturable core transformer 34. The center tap on winding 32, in turn, is connected through a back-biased diode 36 to the negative terminal 14 of the voltage source $E_s$ as shown. The cathode of diode 36 is connected to the positive terminal 20 of source $E_s$ through resistor 38.

The opposite ends of the primary winding 40 of the saturable core transformer 34 are connected to the bases of a second pair of transistors 42 and 44. The collector of transistor 42 is connected through current limiting resistor 45 to one end of the primary winding 16 on transformer 18; while the collector of transistor 44 is connected directly to the other end of the primary winding 16. The emitter of transistor 42 is connected through resistor 46 to a tap 48 on the primary winding 40; whereas the emitter of transistor 44 is similarly connected through resistor 50 to a tap 52 on the primary winding 40. In shunt with transistor 42 and resistor 46 is the parallel combination of diode 54 and a resistor 56. Similarly, a diode 58 and resistor 60 are connected in shunt with the transistor 44 and resistor 50. The size of the resistors 46 and 50 is about 1/100th of the size of resistors 56 and 60.

In the operation of the circuit, and assuming that the voltage source $E_s$ is initially applied across the terminals 14 and 20, one transistor 10 or 12 will have a slightly higher gain than the other, causing this transistor to conduct while the other is cut off. In the usual inverter of this type, the resistor 45 is connected directly to the top of the primary winding 40 of saturable core transformer 34; while the bottom of this primary winding is connected directly to winding 16. Under these assuming and assuming that transistor 10 is conducting, drive current for transformer 34 will flow through the lower half of the primary winding 16 of output transformer 18 and will also flow through the primary winding 40 and through resistor 45 to the upper half of the primary winding 16. Under these conditions, the upper end of the primary winding 40 on saturable core transformer 34 will be negative; while the upper end of the secondary winding 32 will be positive, providing base drive for the transistor 10. Transistor 10 will continue to conduct until the transformer 34 saturates, whereupon the flux in the core of transformer 34 collapses; the polarity across the secondary winding 32 is reversed; and transistor 12 is now driven into conduction with transistor 10 cut off, thereby causing current to flow through the primary winding 40 in the opposite direction until the transformer saturates, whereupon the switching action again takes place.

As will be understood, in a prior art circuit of the type described wherein the ends of the primary winding 40 are connected to winding 16 through resistor 45 only, the primary current rises to a high value when the transformer 34 saturates, limited only by resistor 45. It can remain high until the remaining inverter elements have responded to the change and reduce the applied voltage. The width of this surge pulse can be several hundred nanoseconds. Consequently, in a high frequency inverter, a significant amount of power is consumed in supplying this pulse. The size of resistor 45 cannot be increased appreciably since its impedance must be small compared with that of the primary winding 40 on saturable core transformer 34. As a result, high current spikes occur.

In the invention shown in FIG. 1, the surge current pulse is kept to a low value as follows: Assume, for example, that transistor 10 has just begun conducting. As the collector of transistor 12 rises toward a value equal to two times the source voltage $E_s$, current flows into the primary winding 40 of transformer 34 through resistor 60 to tap 52 through winding 40, out tap 48, through diode 54 and resistor 45 back to winding 16 of transformer 18. This, in turn, causes the lower end of the primary winding 40 to become positive with respect to tap 52 and provides base drive for transistor 44 sufficiently to saturate the transistor 44. Exciting current for the primary winding 40 now flows through transistor 44, resistor 50, tap 52, primary winding 40, tap 48, and diode 54 to primary winding 16 on output transformer 18. This makes the upper end of the secondary winding 32 positive with respect to its mid-tap, thereby providing base drive for transistor 10. Resistor 50 presents very little resistance to the flow of current to the primary winding 40.

When transformer 34 saturates, the current through transistor 44 which is saturated and now conducting, begins to rise, thereby raising the voltage across resistor 50 and reducing the base drive of transistor 44. This, in turn, limits the collector current of transistor 44 which comes out of saturation and cuts off. Surge current must now flow through resistor 60, winding 40 between taps 52 and 48 and diode 54. Since the source voltage cannot provide an increasing saturation current to the transformer 34, the voltage on the secondary winding 32 drops to a low voltage and transistor 10 begins to turn OFF. Following the cutoff of transistor 44, the stored energy in transformer 34 acts to keep current flowing out terminal 48 of winding 40, thus causing a reversal of voltage potentials on all windings of transformer 34. This acts to turn ON transistor 12 and to turn OFF transistor 10. During the alternate half cycle, transistor 12, transistor 42 and the remaining elements function in a similar manner except that transistor 42 is now saturated and current flows through that transistor, the primary winding of transformer 34 and diode 58.

Figure 2:
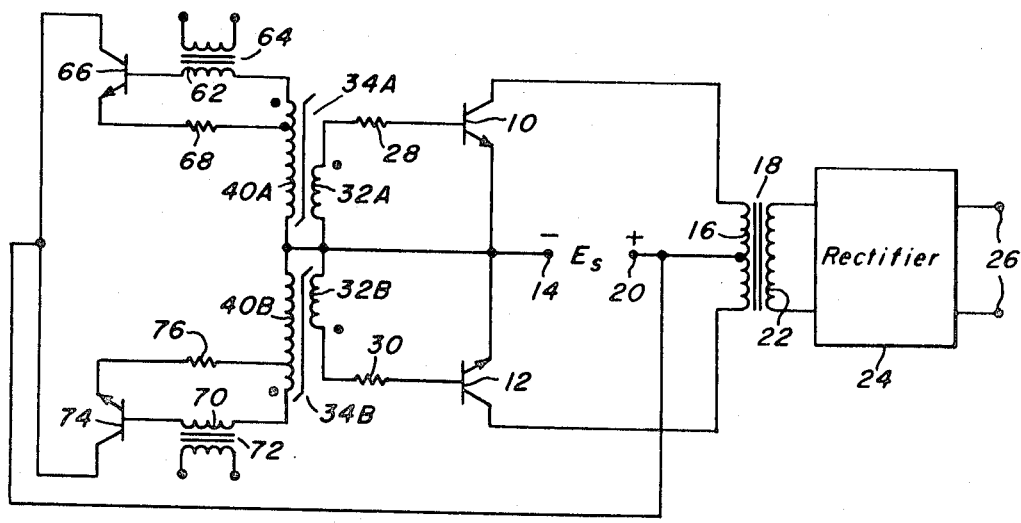
FIG. 2 is a schematic circuit diagram of another embodiment of the invention which provides for constant amplitude output pulses with variable OFF times between pulses.

With reference now to FIG. 2, another embodiment of the invention is shown wherein elements corresponding to those of FIG. 1 are identified by like reference numerals. In this case, however, there are two saturable core transformers 34A and 34B. The upper end of the primary winding 40A of transformer 34A is connected through the second winding 62 of a pulse transformer 64 to the base of transistor 66. The collector of transistor 66 is connected to the positive terminal 20 of voltage source $E_s$ while the emitter of this same transistor is connected through resistor 68 and the lower portion of the primary winding 40A to the negative terminal 14 of voltage source $E_s$. Similarly, the lower end of primary winding 40B of transformer 34B is connected through the primary winding 70 of pulse transformer 72 to the base of a second transistor 74 having its collector connected to positive terminal 20 and its emitter connected through resistor 76 and the upper portion of primary winding 40B to the negative terminal 14.

With this arrangement, and assuming that a pulse is applied to the primary winding of pulse transformer 64, transistor 66 will be driven into conduction, thereby applying a positive bias to the base of transistor 10, causing it to conduct. This action will continue until the transformer 34A saturates. The core material of the transformer has a low residual flux density; and the transformer is reset by dissipating its stored energy in the circuitry. The circuit will remain in a quiescent state until a pulse is applied to the primary winding of pulse transformer 72, thereby driving transistor 74 into conduction. This supplies base drive to transistor 12, thereby causing it to conduct until the transformer 34B saturates, whereupon the stored energy in this transformer is again dissipated to the circuitry. In this manner, it can be seen that a pulse will appear at the output whenever a pulse is supplied to one of the two transformers 64 or 72. This pulse will have a fixed duration and constant amplitude, but the time duration between pulses can be varied by varying the pulse rate of the pulses applied to the transformers 64 and 72.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a direct current to direct current chopper inverter of the type wherein one terminal of a direct current source is connected to a center tap on the primary winding of an output transformer and the other terminal is connected to the opposite ends of said primary winding through first and second switching transistors, and wherein the bases of said transistors are connected to the opposite ends of the secondary winding of a saturable core transformer having a primary winding through which current from said source flows to cause saturation of the saturable core transformer and switching of said first and second transistor; the improvement of means associated with the primary winding of said saturable core transformer for dissipating surge currents when the transformer saturates, said last-named means including third and fourth transistors having their bases connected to opposite ends of said primary winding of the saturable core transformer, their emitters connected to said primary winding of the saturable core transformer at points intermediate its ends and their collectors connected to the primary winding of said output transformer.

2. The improvement of claim 1 including a diode and a resistor in parallel connected in shunt with the emitters and collectors of each of said third and fourth transistors.

3. The improvement of claim 1 wherein the collectors of said third and fourth transistors are connected to opposite ends of the primary winding of said output transformer.

4. The improvement of claim 1 including emitter resistors for said third and fourth transistors.

5. The improvement of claim 1 including pulse transformers having secondary windings connected to the bases of said third and fourth transistors whereby the switching rate of said first and second transistors can be controlled by pulses applied to said pulse transformers.

* * * * *